(12) United States Patent
Kamamoto et al.

(10) Patent No.: US 10,054,155 B2
(45) Date of Patent: Aug. 21, 2018

(54) BALL BEARING

(71) Applicant: JTEKT CORPORATION, Osaka-shi, Osaka (JP)

(72) Inventors: Shigeo Kamamoto, Kashiwara (JP); Junji Murata, Kashiba (JP); Yuki Shishihara, Kashiwara (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

(21) Appl. No.: 15/401,796

(22) Filed: Jan. 9, 2017

(65) Prior Publication Data

US 2017/0204901 A1     Jul. 20, 2017

(30) Foreign Application Priority Data

Jan. 19, 2016 (JP) .................................. 2016-007921

(51) Int. Cl.
*F16C 33/38* (2006.01)
*F16C 19/06* (2006.01)
*F16C 33/58* (2006.01)

(52) U.S. Cl.
CPC .......... *F16C 19/06* (2013.01); *F16C 33/3806* (2013.01); *F16C 33/3843* (2013.01); *F16C 33/585* (2013.01)

(58) Field of Classification Search
CPC .............. F16C 33/3806; F16C 33/3356; F16C 33/3837; F16C 33/3887; F16C 33/3843
See application file for complete search history.

(56) References Cited

U.S. PATENT DOCUMENTS

| | | | | |
|---|---|---|---|---|
| 2,360,419 A | * | 10/1944 | Hickling | F16C 33/414 |
| | | | | 384/534 |
| 3,506,316 A | * | 4/1970 | McKee | F16C 33/3806 |
| | | | | 384/516 |
| 8,944,693 B2 | * | 2/2015 | Katsuno | F16C 33/3856 |
| | | | | 384/531 |
| 9,127,716 B2 | * | 9/2015 | Kamamoto | F16C 33/3806 |
| 2017/0023060 A1 | * | 1/2017 | Kamamoto | F16C 33/3806 |

FOREIGN PATENT DOCUMENTS

| | | | | |
|---|---|---|---|---|
| GB | 2107003 A | * | 4/1983 | .............. F16C 33/38 |
| JP | 2014-070669 A | | 4/2014 | |

* cited by examiner

*Primary Examiner* — Thomas R Hannon
(74) *Attorney, Agent, or Firm* — Oliff PLC (57) ABSTRACT

A ball bearing includes an inner ring with an inner raceway groove formed on an outer periphery of the inner ring, an outer ring with an outer raceway groove formed on an inner periphery of the outer ring, a plurality of balls interposed between the inner raceway groove and the outer raceway groove, and an annular cage that holds the balls at predetermined intervals along a circumferential direction. The cage has an annular portion positioned on an axially first side of the balls and a plurality of cage bars extending from the annular portion toward an axially second side. Each of the cage bars has a guide portion that positions the cage by contacting an area of the inner raceway groove that is different from an area contacted by the balls and pocket surfaces each come into point contact with a corresponding one of the balls.

1 Claim, 7 Drawing Sheets

Prior Art

BALL BEARING

INCORPORATION BY REFERENCE

The disclosure of Japanese Patent Application No. 2016-007921 filed on Jan. 19, 2016 including the specification, drawings and abstract, is incorporated herein by reference in its entirety.

BACKGROUND OF THE INVENTION

1. Field of the Invention

The invention relates to a ball bearing.

2. Description of the Related Art

Figure 7:
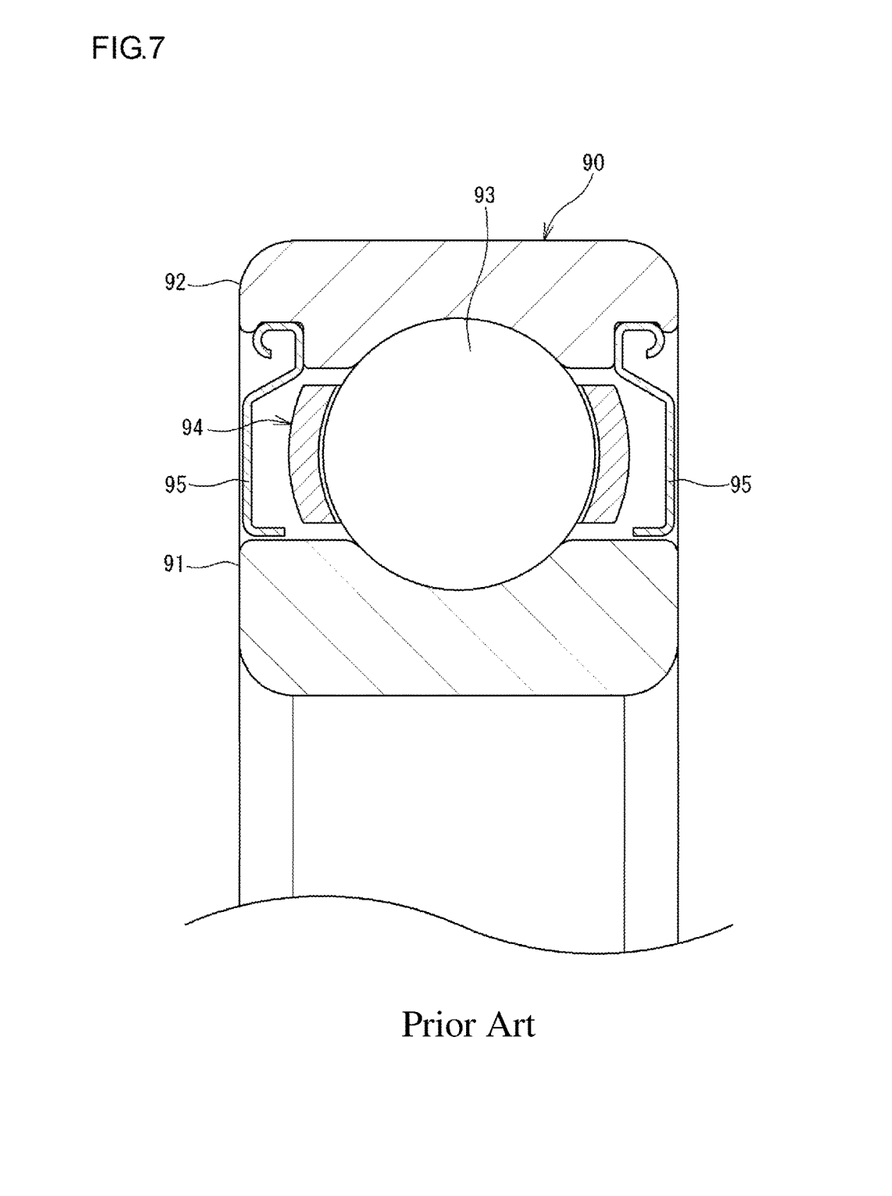
FIG. 7 is a sectional view depicting a conventional ball bearing.

Ball bearings involve a lower torque (smaller rotational resistance) than roller bearings such as tapered roller bearings. However, there has been a demand for a further reduction in the torque of ball bearings. As depicted in FIG. 7, a conventional ball bearing 90 has an inner ring 91, an outer ring 92, a plurality of balls 93, and an annular cage 94. The balls 93 are held at intervals in a circumferential direction by the cage 94. The cage 94 is guided (positioned) by coming into surface contact with the balls 93 (see, for example, Japanese Patent Application Publication No. 2014-70669 (JP 2014-70669 A). In the ball bearing 90 depicted in FIG. 7, sealing apparatuses 95 are provided on axially opposite sides of the bearing so as to avoid external leakage of grease present between the inner ring 91 and the outer ring 92.

In the conventional ball bearing 90, a slipping velocity between the cage 94 and each of the balls 93 is very high, leading to a very high shear velocity of the grease present between the cage 94 and the ball 93. This increases viscous resistance of the grease, disadvantageously resulting in an increased rotational torque of the ball bearing and a shortened life of the grease.

SUMMARY OF THE INVENTION

An object of the invention is to provide a ball bearing that enables a reduction in rotational torque.

A ball bearing in an aspect of the invention includes an inner ring with an inner raceway groove formed on an outer periphery of the inner ring, an outer ring with an outer raceway groove formed on an inner periphery of the outer ring, a plurality of balls interposed between the inner raceway groove and the outer raceway groove, and an annular cage that holds the balls at predetermined intervals along a circumferential direction. The cage has an annular portion positioned on an axially first side of the balls and a plurality of cage bars extending from the annular portion toward an axially second side. Each of the cage bars has a guide portion that positions the cage by contacting the inner raceway groove and pocket surfaces each come into point contact with a corresponding one of the balls.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
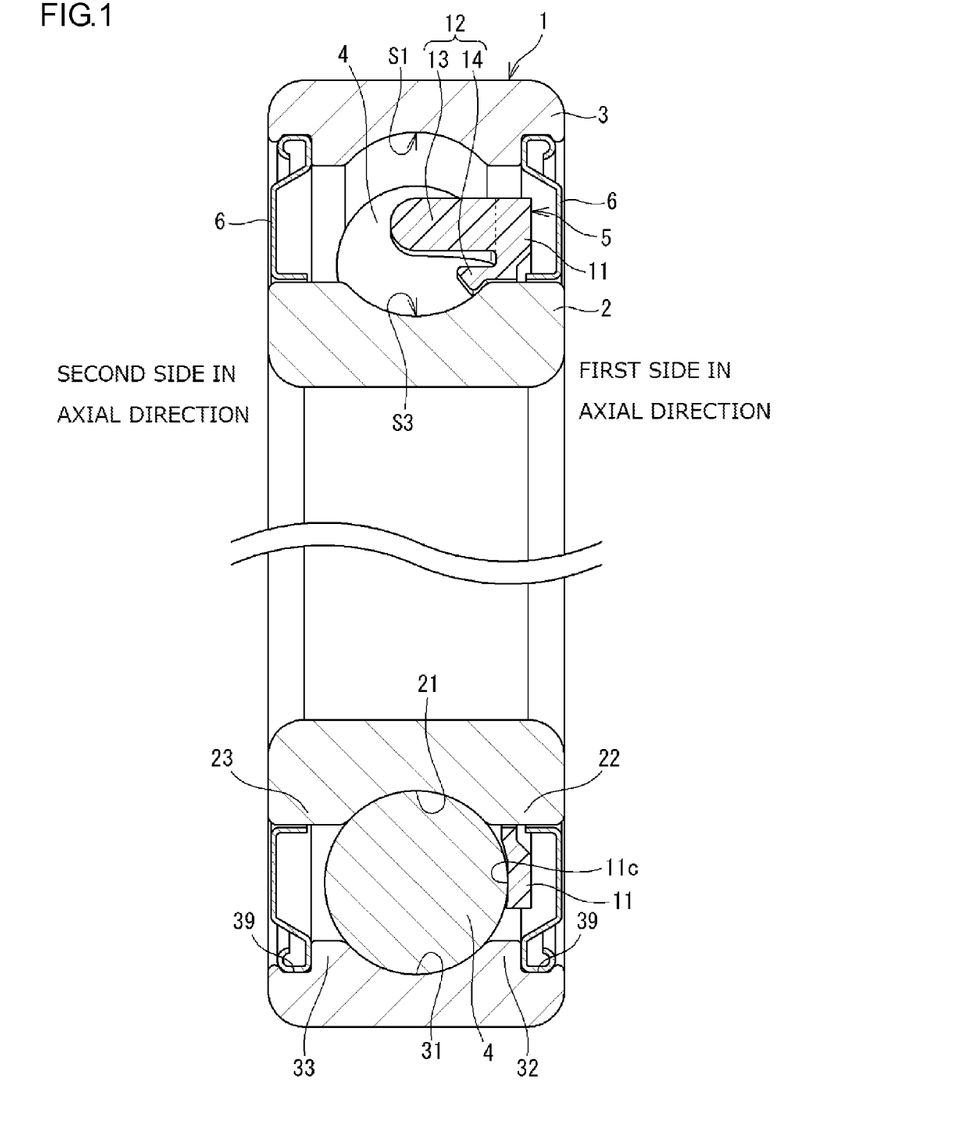
FIG. 1 is a sectional view depicting an embodiment of a ball bearing in the invention.

An embodiment of the invention will be described based on the drawings. FIG. 1 is a sectional view depicting an embodiment of a ball bearing in the invention. The ball bearing 1 includes an inner ring 2, an outer ring 3, a plurality of balls 4, and a cage 5. The outer ring 3 is provided outward of the inner ring 2 in a radial direction. The balls 4 are interposed between the inner ring 2 and the outer ring 3. The cage 5 holds the balls 4.

The ball bearing 1 depicted in FIG. 1 includes sealing apparatuses 6 on axially opposite sides of the bearing. The sealing apparatuses 6 prevent external leakage of grease in a bearing interior in which the balls 4 and the cage 5 are provided. The sealing apparatuses 6 also have a function to prevent foreign matter from entering the bearing interior.

The inner ring 2 is an annular member having an inner raceway groove 21 which is formed on an outer periphery of the inner ring 2 and along which the balls 4 roll. In a longitudinal section depicted in FIG. 1, the inner raceway groove 21 is shaped like a recessed circular arc having a slightly larger radius than each ball 4. The inner ring 2 has a first shoulder portion 22 on an axially first side of the inner raceway groove 21 and a second shoulder portion 23 on an axially second side of the inner raceway groove 21.

The outer ring 3 is an annular member having an outer raceway groove 31 which is formed on an inner periphery of the outer ring 3 and along which the balls 4 roll. In the longitudinal section depicted in FIG. 1, the outer raceway groove 31 is shaped like a recessed circular arc having a slightly larger radius than each ball 4. The outer ring 3 has a first shoulder portion 32 on the axially first side of the outer raceway groove 31 and a second shoulder portion 33 on the axially second side of the outer raceway groove 31. Grooves 39 are formed on respective inner peripheral surfaces of opposite ends of the outer ring 3 in the axial direction. The sealing apparatuses 6 are mounted in the respective grooves 39. The ball bearing 1 in the present embodiment is a deep groove ball bearing.

A plurality of the balls 4 is interposed between the inner raceway groove 21 and the outer raceway groove 31. Rotation of the ball bearing 1 (inner ring 2) allows the balls 4 to roll along the inner raceway groove 21 and the outer raceway groove 31. The balls 4 contact the inner raceway groove 21 at the deepest point thereof (area S3) and contact the outer raceway groove 31 at the deepest point thereof (area S1). The balls 4 are steel members formed using bearing steel or the like. The inner ring 2 and the outer ring 3 are formed of steel such as bearing steel or steel for machine structural use.

Figure 2:
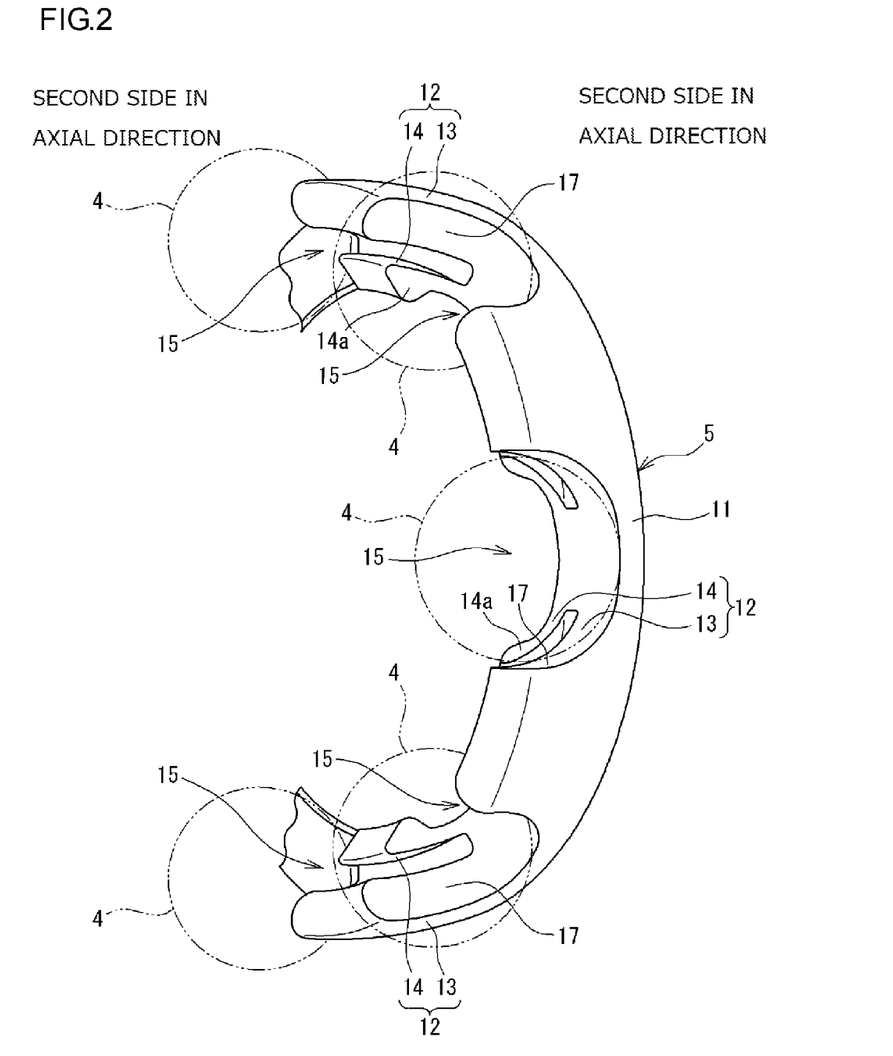
FIG. 2 is a perspective view depicting a part of a cage.

FIG. 2 is a perspective view depicting a part of the cage 5. The cage 5 has an annular portion 11 and a plurality of cage bars 12 and is what is called a snap cage. The annular portion 11 is positioned on the axially first side of the balls 4. The cage bars 12 extend from the annular portion 11 toward the second side in the axial direction. The annular portion 11 is a circular ring-shaped portion and is positioned between the shoulder portion 22 of the inner ring 2 (see FIG. 1) and the shoulder portion 32 of the outer ring 3. All the cage bars 12 have the same shape. As described below, each of the cage bars 12 has a main body portion 13 and a guide portion 14. The cage 5 is formed of resin (synthetic resin) and manufactured by injection molding. The annular portion 11 and the cage bars 12 are integrally formed. The cage 5 is formed of a single member.

A pocket 15 corresponds to a space located on the second side in the axial direction with respect to the annular portion 11 and between the cage bars 12, 12 adjacent to each other in the circumferential direction. A plurality of the pockets 15 is formed along the circumferential direction. The cage 5 can hold the balls 4 at predetermined intervals along the circumferential direction.

The sealing apparatuses 6 depicted in FIG. 1 are annular shield plates. Each of the sealing apparatuses 6 is attached to the outer ring 3 by fitting an outer peripheral portion (radially outer portion) of the sealing apparatus 6 into the corresponding groove 39 of the outer ring 3. An inner peripheral portion (radially inner portion) of the sealing apparatus 6 faces the inner ring 2 (shoulder portion 22, 23) across a clearance, and forms a labyrinth seal. Although not depicted in the drawings, the sealing apparatus 6 may be a seal having an annular core and a rubber member that is fixed to the core and that slidably contacts the inner ring 2.

Figure 3:
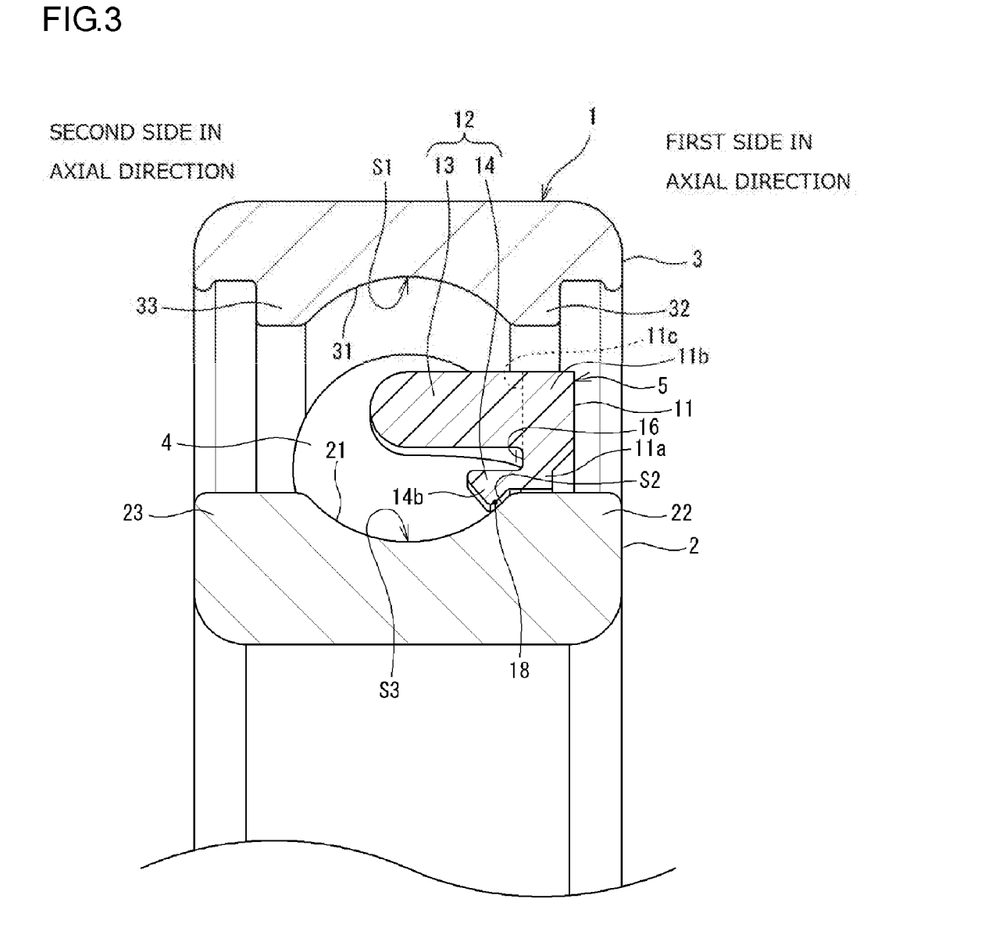
FIG. 3 is a sectional view of an inner ring, an outer ring, and a cage.

FIG. 3 is a sectional view of the inner ring 2, the outer ring 3, and the cage 5. In FIG. 3, the sealing apparatuses 6 have been removed from the ball bearing. As described above, the cage 5 includes the annular portion 11 and the cage bars 12. As depicted in FIG. 2 and FIG. 3, each of the cage bars 12 has the main body portion 13 that is brought into contact with the corresponding ball 4 and the guide portion 14 that is brought into contact with the inner raceway groove 21.

The main body portion 13 extends linearly from a radially outer portion 11b of the annular portion 11 toward the second side in the axial direction. The guide portion 14 extends from a radially inner portion 11a of the annular portion 11 toward the second side in the axial direction. A protruding portion 14b protruding toward the inner raceway groove 21 and inward in the radial direction is formed on an axially middle portion of the guide portion 14.

Figure 4:
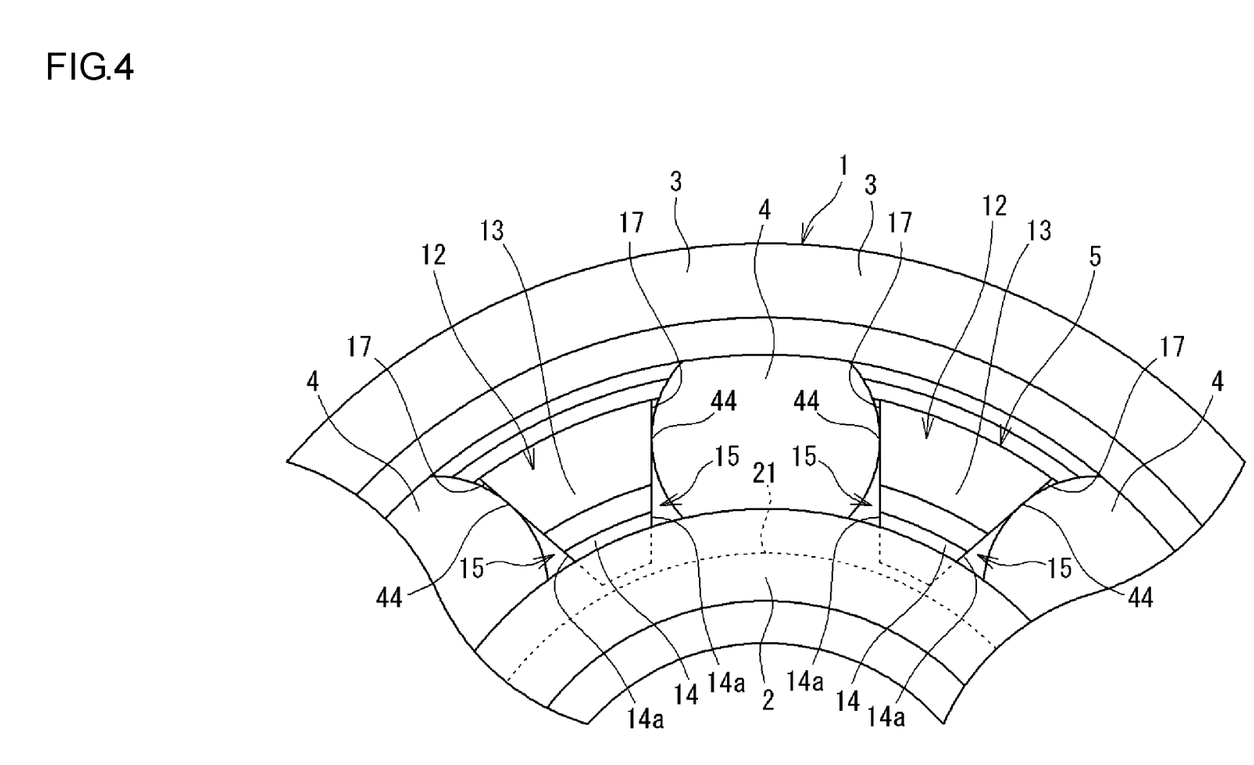
FIG. 4 is a diagram depicting a part of the inner ring, a part of the outer ring, some balls, and a part of the cage as viewed in an axial direction.

FIG. 4 is a diagram depicting a part of the inner ring 2, a part of the outer ring 3, some of the balls 4, and a part of the cage 5 as viewed in the axial direction. The main body portion 13 of each of the cage bars 12 of the cage 5 has, on circumferentially opposite sides of the main body portion 13, pocket surfaces 17 that are in point contact with the corresponding balls 4. In FIG. 4, a contact point on each of the pocket surfaces 17 contacted by the corresponding ball 4 is denoted by reference numeral 44. A pair of the pocket surfaces 17, 17 holding one ball 4 in a sandwiching manner forms a part of the pocket in which the ball 4 is housed. On an extension of each of the pocket surfaces 17 of the main body portion 13, a side surface 14a of the corresponding guide portion 14 is present. The side surface 14a is also a part of the pocket 15 but does not contact the ball 4.

The guide portions 14 of the cage bars 12 allow the cage 5 to be positioned in the radial direction. In other words, when the inner ring 2 and the cage 5 are concentrically arranged, a part of each of the guide portions 14 (protruding portion 14b) faces the inner raceway groove 21 across a clearance as depicted in FIG. 3. Radial displacement of the cage 5 enables a part of the guide portion 14 (contact portion 18) to contact the inner raceway groove 21 in the radial direction. In particular, the guide portions 14 contact a non-contact area S2 of the inner raceway groove 21, that is, an area of the inner raceway groove 21 that is different from the area S3 contacted by the balls 4.

In the present embodiment, each of the guide portions 14 contacts the non-contact area S2 of the inner raceway groove 21 only at one point. The non-contact area S2 is a position of the inner raceway groove 21 that is closer to the shoulder portion 22 than the area S3 contacted by the ball 4. This configuration allows the guide portions 14 to position the cage 5 in the radial direction. A portion of the guide portion 14 that contacts the inner raceway groove 21 is referred to as the contact portion 18.

The inner raceway groove 21 is shaped like a recessed circular arc such that a part of each guide portion 14 (including the contact portion 18) is positioned in the inner raceway groove 21. Thus, when the cage 5 is displaced toward the first side in the axial direction, a part of the guide portion 14 (contact portion 18) can come into contact with the inner raceway groove 21 in the axial direction. Consequently, the guide portions 14 allow regulation of movement of the cage 5 toward the first side in the axial direction to position the cage 5.

A ball-4-side surface 11c of the annular portion 11 of the cage 5 is enabled to come into contact with the corresponding ball 4 in the axial direction when the cage 5 is displaced toward the second side in the axial direction. Consequently, the annular portion 11 allows regulation of movement of the cage 5 toward the second side in the axial direction to position the cage 5. The surface 11c of the annular portion 11 is also a part of the pocket 15.

Figure 5:
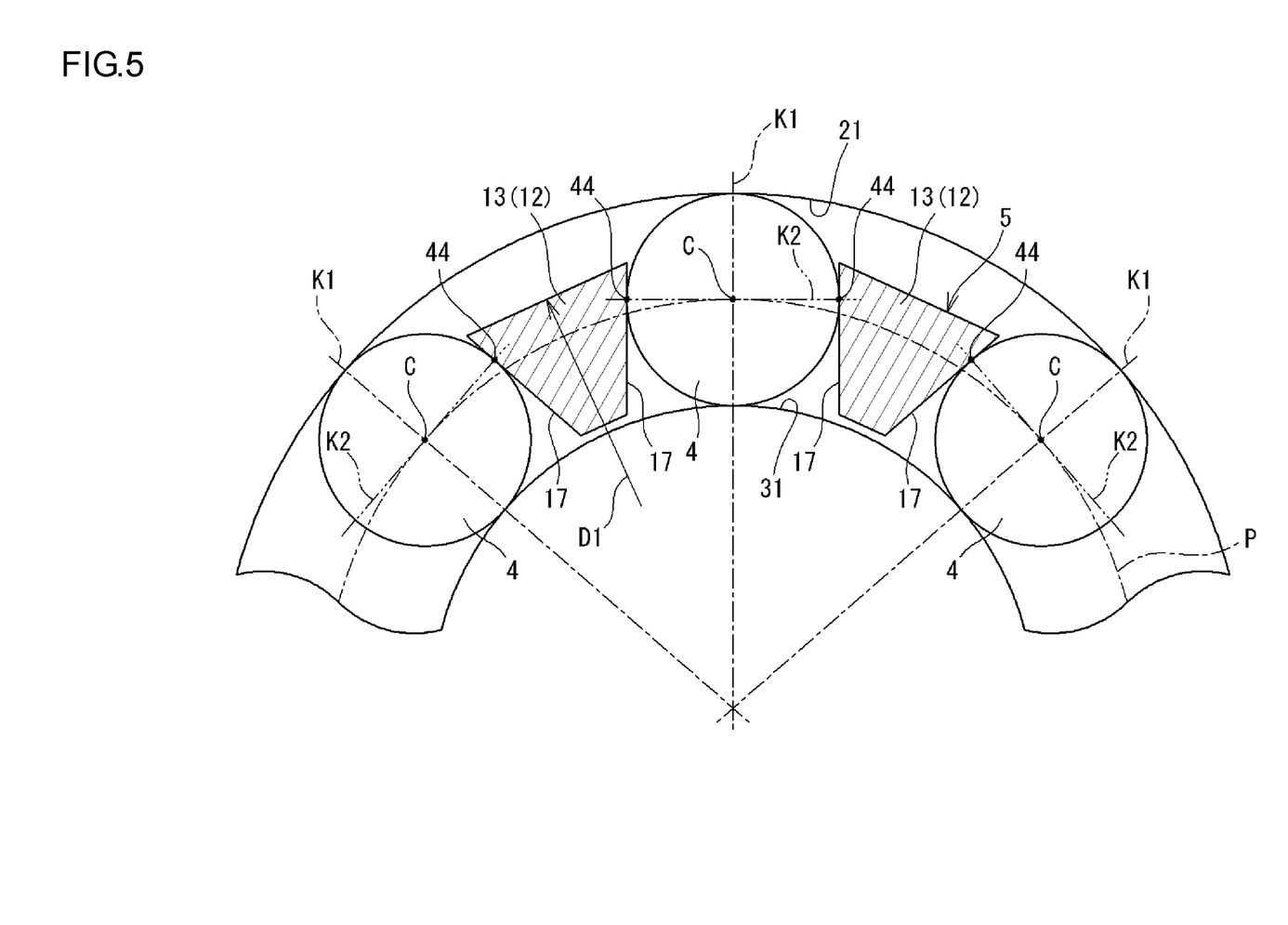
FIG. 5 is a diagram illustrating contact between the balls and cage bars (main body portions) of the cage.

FIG. 5 is a diagram illustrating contact between the balls 4 and the cage bars 12 (main body portions 13) of the cage 5. The pocket surfaces 17 of each main body portion 13 in the present embodiment are each formed to come into point contact with the corresponding ball 4 on a circumferential virtual line K2 that passes through a center of the ball 4 and that is perpendicular to a radial virtual line K1 passing through the center C of the ball 4. Thus, the main body portion 13 is shaped like a trapezoid in section. The contact points 44 on the pocket surfaces 17 contacted by the corresponding ball 4 are positioned outward of a pitch circle P of the balls 4 in the radial direction. Therefore, in the present embodiment, an outside diameter D1 of the cage 5 can be made larger than an outside diameter D2 of the cage 5 in a variation described below (see FIG. 6).

As described above, in the ball bearing 1 in the present embodiment, the guide portions 14 of the cage bars 12 of the cage 5 contact the inner raceway groove 21 of the inner ring 2 to position the cage 5. Consequently, compared to a case where the cage 5 is positioned by contacting the balls 4 as in the related art, the present embodiment enables a reduction in a slipping velocity between the cage 5 and the member contacted by the cage 5 and also in a shear velocity of grease. The reason is as follows.

The shear velocity of the grease between the cage 5 and the member contacted by the cage 5 (balls 4) in the related art corresponds to a rolling speed of the balls 4. In the present embodiment, the shear velocity of the grease between the cage 5 and the member contacted by the cage 5 (inner raceway groove 21) is obtained by subtracting a revolution speed of the balls 4 from the rolling speed of the balls 4 and is lower than the rolling speed of the balls 4 by a value equal to the revolution speed of the balls 4.

As described above, the present embodiment enables a reduction in the shear velocity of the grease and thus in the rotational torque of the ball bearing 1. The pocket surfaces 17 of each cage bar 12 (main body portion 13) come into point contact with the corresponding ball 4. Thus, compared to the conventional ball bearing, the present embodiment can reduce the contact area between each cage bar 12 and the corresponding ball 4, enabling a further reduction in the rotational torque of the ball bearing 1.

Each pocket surface 17 contacts the corresponding ball 4 outward of the pitch circle P of the balls 4 in the radial direction, allowing an increase in the outside diameter of the cage 5 (main body portions 13). This enables a reduction in the rotational torque of the ball bearing 1 while enhancing the strength of the cage 5.

Figure 6:
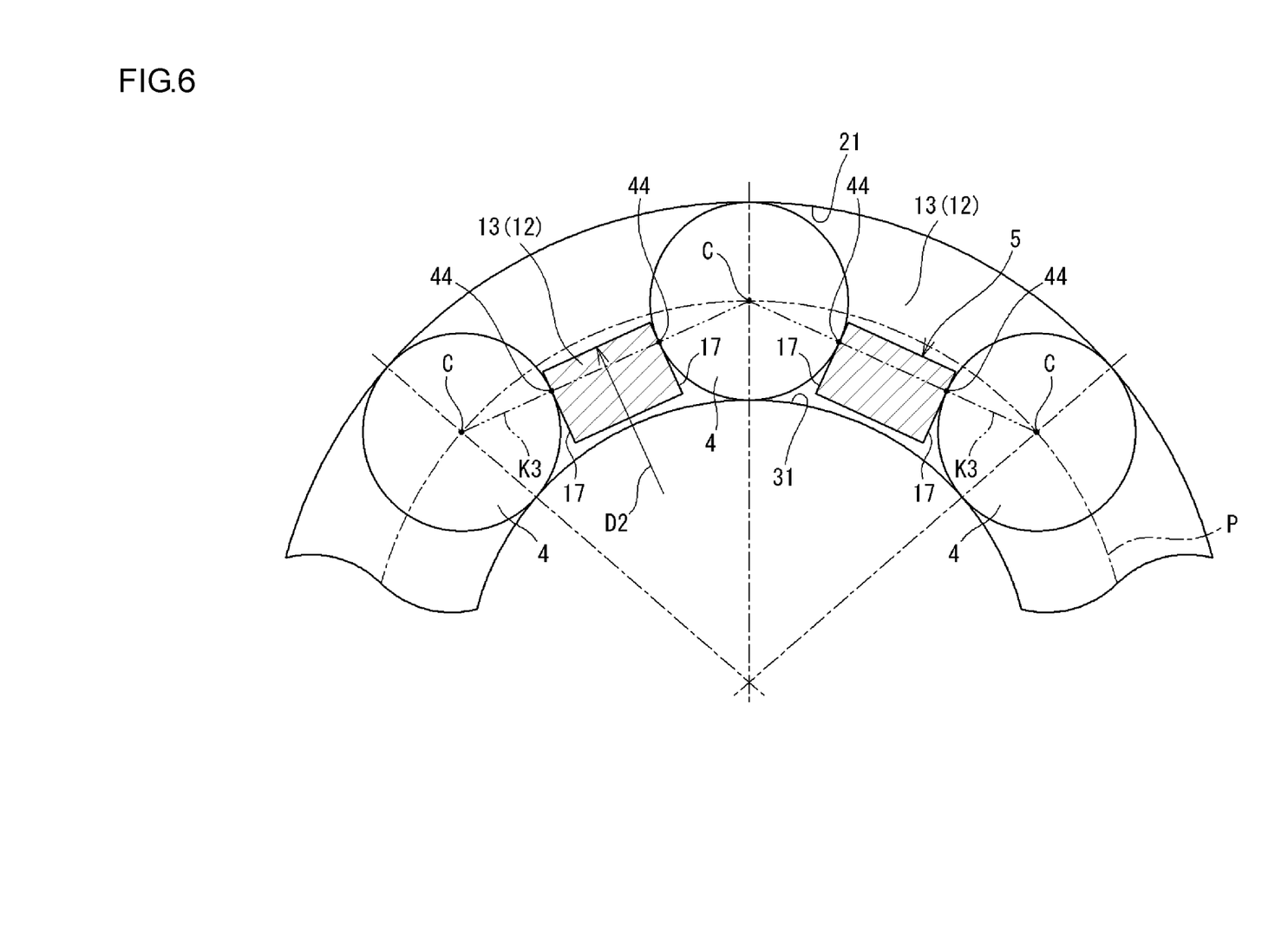
FIG. 6 is a diagram illustrating a variation of the contact between the balls and the cage bars (main body portions) of the cage.

FIG. 6 is a diagram illustrating a variation of the contact between the balls 4 and the cage bars 12 (main body portions 13) of the cage 5. The pocket surfaces 17 of each main body portion 13 in the present variation are formed to come into point contact with the corresponding balls 4 adjacent to each other in the circumferential direction across the main body portion 13, on a virtual line K3 connecting the centers C of the balls 4. Thus, each main body portion 13 in the present variation is shaped like a rectangle in section. The contact points 44 on the pocket surfaces 17 contacted by the corresponding ball 4 are positioned inward of the pitch circle P of the balls 4 in the radial direction. Therefore, in the present variation, the outside diameter D2 of the cage 5 can be made smaller than the outside diameter D1 of the cage 5 in the above-described embodiment (see FIG. 5).

As described above, in the present variation, the pocket surfaces 17 contact the balls 4 inward of the pitch circle P of the balls 4 in the radial direction, allowing a reduction in the outside diameter of the cage 5. This enables a reduction in stirring resistance of the grease, resulting in a further reduced rotational torque of the ball bearing 1. A reduced outside diameter of the cage 5 enables a reduction in cost. The ball bearing 1 is suitable for use under a light load.

The disclosed embodiment is illustrative and not restrictive. The scope of the right of the invention is indicated by the claims and includes the configurations in the claims and all variations within the range of equivalency. For example, in the above-described embodiment, the ball bearing is a deep groove ball bearing. However, the invention is applicable to an angular ball bearing.

The ball bearing in the invention enables a reduction in rotational torque.

What is claimed is:
1. A ball bearing comprising:
    an inner ring with an inner raceway groove formed on an outer periphery of the inner ring;
    an outer ring with an outer raceway groove formed on an inner periphery of the outer ring;
    a plurality of balls interposed between the inner raceway groove and the outer raceway groove; and
    an annular cage that holds the balls at predetermined intervals along a circumferential direction, wherein
    the cage has an annular portion positioned on an axially first side of the balls and a plurality of cage bars extending from the annular portion toward an axially second side, and
    each of the cage bars has a guide portion that positions the cage by contacting the inner raceway groove, and pocket surfaces that are each formed to come into point contact with a corresponding one of the balls on a circumferential virtual line that passes through a center of the ball and that is perpendicular to a radial virtual line passing through the center of the ball.

* * * * *